United States Patent
Tosco et al.

(12)

(10) Patent No.: US 6,390,796 B1
(45) Date of Patent: May 21, 2002

(54) SYSTEM AND A METHOD FOR COOLING MOULDS FOR EXPANDED POLYSTYRENE

(75) Inventors: Bartolomeo Tosco, Almese; Giacomo Rovera, Turin, both of (IT)

(73) Assignee: Fata Aluminum division of Fata Group S.p.A., Turin (IT)

( * ) Notice: Subject to any disclaimer, the term of this patent is extended or adjusted under 35 U.S.C. 154(b) by 0 days.

(21) Appl. No.: 09/371,860

(22) Filed: Aug. 11, 1999

(30) Foreign Application Priority Data

Aug. 11, 1998 (EP) .......................................... 98830498

(51) Int. Cl.[7] .............................................. B29C 33/02
(52) U.S. Cl. ......................................... 425/86; 425/4 R
(58) Field of Search .................................... 425/4 R, 86

(56) References Cited

U.S. PATENT DOCUMENTS

| | | | | | |
|---|---|---|---|---|---|
| 3,156,015 A | * | 11/1964 | Harrison | ....................... | 425/86 |
| 3,261,055 A | * | 7/1966 | Dart | ............................. | 425/86 |
| 3,837,769 A | * | 9/1974 | Erlenbach | ................... | 425/4 R |
| 4,327,045 A | * | 4/1982 | Nishikawa et al. | ......... | 425/4 R |
| 4,482,306 A | * | 11/1984 | Hahn | .......................... | 425/4 R |
| 4,627,946 A | * | 12/1986 | Crabtree | .................... | 425/4 R |
| 4,685,872 A | * | 8/1987 | Erlenbach | ................... | 425/4 R |
| 4,698,191 A | * | 10/1987 | Endo et al. | ................. | 425/4 R |
| 4,813,859 A | * | 3/1989 | Bullard et al. | .............. | 425/4 R |
| 4,818,451 A | * | 4/1989 | Arai et al. | ................... | 425/4 R |
| 4,822,542 A | * | 4/1989 | Kuwabara et al. | .......... | 425/4 R |
| 4,823,765 A | * | 4/1989 | Brohl et al. | ................. | 425/4 R |
| 5,037,592 A | * | 8/1991 | Erlenbach | ................... | 425/4 R |

FOREIGN PATENT DOCUMENTS

| | | | | |
|---|---|---|---|---|
| DE | 733436 C | | 3/1943 | |
| FR | 1521922 A | | 7/1968 | |
| FR | 2461213 A | | 1/1981 | |
| GB | 917733 A | | 6/1982 | |
| GB | 2088735 A | | 6/1982 | |
| JP | 55-109632 | * | 8/1980 | .................. 425/4 R |
| JP | 35-128438 | * | 10/1980 | .................. 425/4 R |
| JP | 56-162622 | * | 12/1981 | .................. 425/4 R |
| JP | 62-132634 | * | 6/1987 | .................. 425/86 |
| JP | 2-155635 | * | 6/1990 | .................. 425/4 R |
| WO | WO 8901597 A | | 2/1989 | |

* cited by examiner

Primary Examiner—Allan R. Kuhns
(74) Attorney, Agent, or Firm—Sughrue Mion, PLLC

(57) ABSTRACT

A system and a method are described for cooling a mold, particularly for expanded polystyrene, by means of jets of water in a depressurized environment. Pumps are used to depressurize the environment and to remove therefrom the steam generated by the jets of water. The pumps are arranged to perform the depressurization by suction directly from a steam-condenser connected to the environment of the mold and having means for cyclically discharging the water condensed in the condensation device.

7 Claims, 1 Drawing Sheet

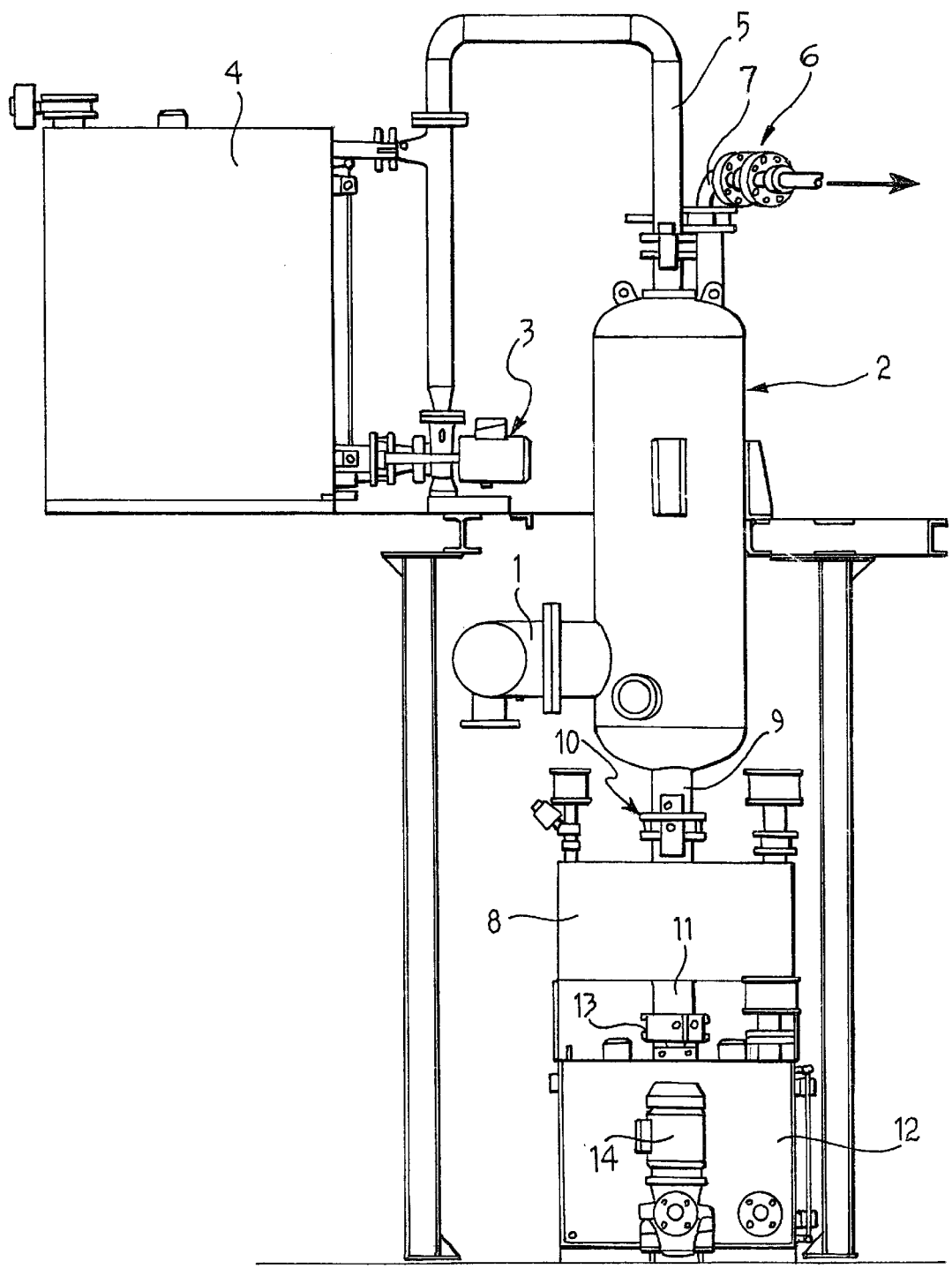

SYSTEM AND A METHOD FOR COOLING MOULDS FOR EXPANDED POLYSTYRENE

TECHNICAL FIELD

The present invention relates to a system and to a method for cooling molds for forming products in expanded polystyrene, particularly expanded polystyrene cores for subsequent use in the production of metal bodies formed by casting by the technique known in English as the "lost foam" technique.

BACKGROUND OF THE INVENTION

It is known that, in order to stop the expansion of polystyrene, it is necessary to cool rapidly the walls of the half-molds which are usually made of aluminum and which define the cavity for molding the polystyrene body.

A widely used cooling technique provides for the half-molds to be placed in a depressurized environment and simultaneously struck by jets of water. Since the temperature of the half-molds reaches a value of about 120° C. at the moment at which the expansion of the polystyrene is stopped, a fraction of the cooling water changes to the vapor state as soon as it comes into contact with the walls of the mold. The steam thus developed has to be removed quickly in order to shorten the operating cycle of the machine as much as possible.

In order to achieve a high output, it is necessary to produce and maintain a high degree of vacuum in the cooling environment to favor rapid evaporation of the water, enabling the heat of evaporation to be utilized for cooling the mold. The steam produced must also be removed rapidly in order to shorten the cooling-cycle times and hence the molding-cycle times.

Ideally, starting from atmospheric pressure conditions, it would be desirable to re-establish a residual pressure of about 0.2 bars absolute within a maximum period of about 3 seconds at the start of each cooling cycle and to maintain these conditions throughout the cooling time.

Since, in the production of polystyrene elements of the type mentioned above, the amounts of heat to be removed for each cycle are on average about 4000 kcal, which is equal to that absorbed by the evaporation of about 7–8 liters of water, and since it is known that 1 liter of water produces about 1.25 $m^3$ of steam at atmospheric pressure and ambient temperature, about 9 $m^3$ of steam is developed for each cycle and it is therefore necessary to remove steam at a rate of approximately 3 $m^3$ per second.

As will be understood, a system of conventional pumps cannot complete the extraction of such a volume of gas in the times indicated; it would be necessary at least to have a system of extremely high-capacity vacuum pumps, involving high installation and running costs.

Conventional steam extraction systems cannot achieve a degree of vacuum below 0.5–0.6 bars absolute, whereas it would be desirable to have a greater degree of vacuum in order to bring about more rapid evaporation and hence quicker cooling due to the evaporation of the water which, as is known, vaporizes more quickly the lower is the ambient pressure.

SUMMARY OF THE INVENTION

The object of the present invention is to provide an improved and highly efficient cooling system which can resolve the limitations of the prior art discussed above. In particular, it is desired to provide a cooling system which can achieve a higher degree of vacuum with the use of conventional suction pumps.

This object is achieved, according to a first aspect of the present invention, by a system for cooling a mold, particularly for expanded polystyrene, by means of jets of water in a depressurized environment, comprising pumping means for depressurizing the environment and removing therefrom the steam generated by the jets of water, wherein said pumping means are arranged to perform the depressurization by suction directly from a steam-condensation device connected to the environment and having means for cyclically discharging the water condensed in said condensation device.

According to another aspect of the present invention, there is proposed a method of cooling a mold, particularly for expanded polystyrene, comprising the steps of:
  providing the mold in an environment,
  sending jets of cooling water onto the mold,
  depressurizing the environment by pumping means and removing from the environment the steam generated by the jets of water,
  at least partially recondensing the steam in a condensation device interposed between the environment and the pumping means, and
  cyclically discharging the water condensed in the condensation device.

BRIEF DESCRIPTION OF THE FIGURE

Further characteristics and advantages of the invention will become clearer from the detailed description of an embodiment thereof, given with reference to the appended drawing which is provided by way of non-limiting example and which is a schematic side elevational view of the cooling system according to the present invention.

DETAILED DESCRIPTION OF THE INVENTION

With reference to the drawing, an intake manifold, indicated 1, puts an evaporative vacuum condenser 2 into communication with a depressurized environment of conventional type (not shown) containing a mold for forming expanded polystyrene bodies. The manifold 1 has a valve (not shown) which can be opened upon command in order to put the condenser 2 into direct communication with the environment of the mold.

As mentioned in the introduction, the outer surfaces of the mold are cooled by jets of water; the structural and functional details of the environment containing the mold and of the devices for supplying the jets of water are not described since they do not form the subject of the present invention.

A pump 3 admits cold water from a tank 4 at the top of the condenser through a pipe 5.

The vacuum in the condenser 2 is generated by a pair of pumps, schematically indicated 6, communicating with the condenser 2 through an upper duct 7.

Immediately below the condenser 2 there is a lower closed reservoir 8 communicating with the condenser through a pipe 9 of limited length and large cross-section, in which a first pneumatically-controlled butterfly valve 10 is disposed. The reservoir 8 communicates at the bottom with a water-discharge tank 12, by means of a further pipe 11 in which there is a second pneumatically-controlled butterfly valve 13. A pump (or a pair of pumps) 14 is connected to the discharge tank 12 for removing the water collected in the tank.

The cooling system operates as follows.

The pumps 6, working continuously, bring about and maintain high vacuum conditions in the condenser 2. When the jets of cooling water are directed onto the mold in order to stop the expansion of the polystyrene, the valve (not shown) in the manifold 1 is opened, immediately creating a vacuum of the order of about 0.2 bars absolute in the environment of the mold. When the valve is opened, a large quantity of steam generated by the contact of the jets of water with the hot surfaces of the mold (at about 120° C.) starts to flow into the condenser 2.

The control which brings about the opening of the valve in the manifold 1 also puts the pump 3 into operation, preferably a few moments in advance; the pump 3 sends cold water from the tank 4 to the top of the condenser 2 in which the water precipitates in the form of a shower. The precipitating drops of water intercept the hot steam inside the condenser and cause it to recondense to a large extent.

As a result of the recondensation performed upstream of the suction pumps 6, the volume of aeriforms which has to be removed by the pumps is drastically reduced owing to the change from the gaseous state to the liquid state. In fact these pumps are reached only by air (non-condensable) and by a minimal percentage of steam which, in the instantaneous pressure and temperature conditions, cannot be condensed.

The temperature of the water delivered from the tank 4 is deliberately low to ensure that the temperature inside the condenser 2 is also kept low to prevent partial re-evaporation of the condensate which would cause loss of the vacuum created.

By way of indication, the flow of cold water into the condenser takes place for a period of about 10–15 seconds, which is necessary to achieve the desired cooling by evaporation of the water injected onto the mold.

The water condensed in the condenser 2 is removed for each cycle by being discharged through the pipe 9 into the reservoir 8. The system of the present invention is advantageously arranged in a manner such that the operation of discharging the water does not lead to a loss of vacuum inside the condenser 2 and hence to the problem of the need to recreate the vacuum completely for each cycle, which would adversely affect the operating times of the molding machine.

In order to evacuate the water from the condenser, the first valve 10 is opened, the second valve 13 being kept closed; the water flows out into the reservoir 8, the capacity of which is considerably less than that of the condenser 2 (about 40–50%) but nevertheless such as to hold all of the water condensed in a cycle in the condenser 2; by way of indication, to dissipate about 4000 kcals/cycle, the reservoir 8 will have to have a capacity of about 300–400 liters.

Upon completion of the admission of the water in the condenser, the first valve 10 is closed and the second valve 13 is then opened, causing the water to be discharged from the reservoir 8 into the tank 12; once the valve 13 is closed and the valve 10 re-opened, the suction pumps 6 re-establish the vacuum in the condenser 2. The opening and closure of the valves of the system may be controlled by a computer.

As will be understood, this configuration enables the loss of vacuum to be limited purely to the volume corresponding to the capacity of the reservoir 8 of suitably small dimensions so that the vacuum conditions are quickly re-established.

As will be appreciated, since the present invention provides for the water in the gaseous phase to be recondensed before it reaches the suction pumps, these pumps may be of dimensions suitable for the removal of considerably smaller volumes of aeriforms than in the past so that normal low-cost pumps can advantageously be used.

Naturally, the principle of the invention remaining the same, the forms of embodiment and details of construction may be varied widely with respect to those described and illustrated purely by way of non-limiting example, without departing from the scope of the invention as defined in the appended claims.

What is claimed is:

1. A system for cooling a mold by means of jets of water in a depressurized environment, the system comprising:

an evaporative condenser (2) connected to the environment by a valve and being supplied at the top with a flow of water for bringing about condensation of the steam coming from the environment, pumping means (6) communicating with the evaporative condenser (2) for depressurizing the condenser directly by suction and thereby remove from the environment the steam generated by the jets of water, a reservoir (8), located below the evaporative condenser (2) and connected thereto by a first valve (10), for cyclically discharging into the reservoir the water condensed in the evaporative condenser (2).

2. The cooling system of claim 1, further comprising a water discharge tank (12) located below the reservoir (8) and connected thereto by a second valve (13).

3. The cooling system of claim 1, wherein the reservoir (8) has a capacity of less than 50% of that of the evaporative condenser (2).

4. The cooling system of claim 1, wherein the condenser (2) and the reservoir (8) are connected by a first pipe (9) having the said first valve (10), the said first pipe (9) having dimensions such as to allow the water to flow out through it rapidly.

5. The cooling system of claim 2, wherein the reservoir (8) and the water discharge tank (12) are connected by a second pipe (11) having the said second valve (13), the said second pipe (11) having dimensions such as to allow the water to flow out through it rapidly.

6. The cooling system of claim 4, wherein said first valve (10) is a pneumatically-controlled butterfly valve.

7. The cooling system of claim 5, wherein said second valve (13) is a pneumatically-controlled butterfly valve.

* * * * *